United States Patent [19]
Roome

[11] Patent Number: 5,693,108
[45] Date of Patent: Dec. 2, 1997

[54] ONE-PIECE FILTER HOUSING

[75] Inventor: David G. Roome, West Henrietta, N.Y.

[73] Assignee: Consler Corporation, Honeoye Falls, N.Y.

[21] Appl. No.: 682,446

[22] Filed: Jul. 17, 1996

Related U.S. Application Data

[60] Provisional application No. 60/003,791 Sep. 15, 1995.
[51] Int. Cl.⁶ .................................................... B01D 35/30
[52] U.S. Cl. .......................... 55/493; 55/495; 55/DIG. 5; 55/DIG. 31
[58] Field of Search .......................... 55/481, 493, 495, 55/497, 506, DIG. 5, DIG. 31

[56] References Cited

U.S. PATENT DOCUMENTS

| | | | |
|---|---|---|---|
| 2,138,874 | 12/1938 | Myers | 55/DIG. 31 |
| 3,447,691 | 6/1969 | Andrews et al. | |
| 3,778,985 | 12/1973 | Daigle et al. | |
| 3,938,973 | 2/1976 | Kershaw | |
| 4,086,071 | 4/1978 | Champlin | |
| 5,269,824 | 12/1993 | Takita | |
| 5,273,564 | 12/1993 | Hill | |
| 5,320,655 | 6/1994 | Ernst | |

Primary Examiner—C. Scott Bushey
Attorney, Agent, or Firm—Eugene Stephens & Associates

[57] ABSTRACT

A lightweight, self-supporting filter housing is disclosed. The housing is economically and simply manufactured by being die cut from flat sheet material to create (a) a plurality of panels serially interconnected at respective scored fold lines and (b) a pair of oppositely disposed holding-frame portions, each of which is interconnected at a scored fold line that is shared with one end of a respective one of the panels. When the sheet material is folded along the scored fold lines, it forms a structure with a tunnel-like passageway open at both ends, and the oppositely disposed holding-frame portions are positioned within the passageway to support the filter media element diagonally along the length of the tunnel-like passageway. The filter media is held in place and sealed within the housing by being pressed between the holding frames when the two outermost panels of the one-piece housing are fastened in superimposed alignment with each other. The housing itself forms the exterior dimensions of the operational filter unit; and it requires no other bracing for protecting the media during shipment, operation, insertion, or removal.

10 Claims, 6 Drawing Sheets

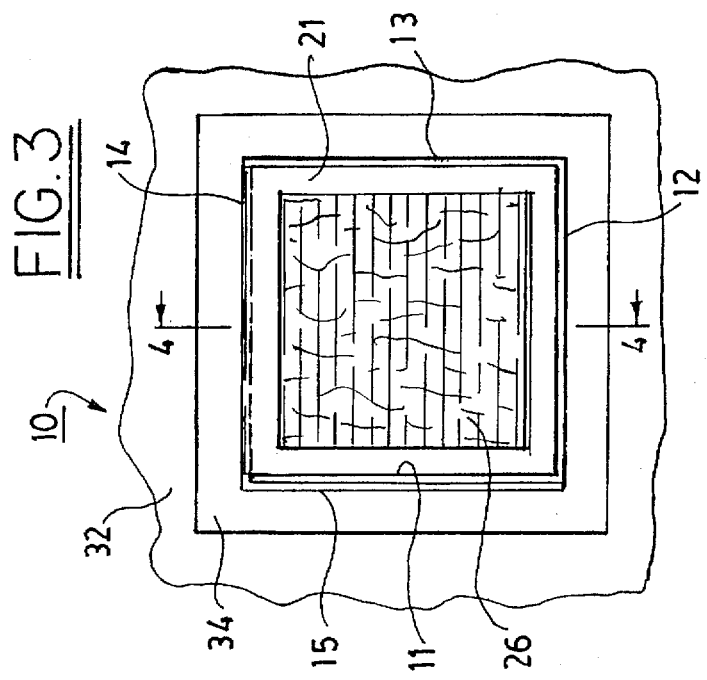
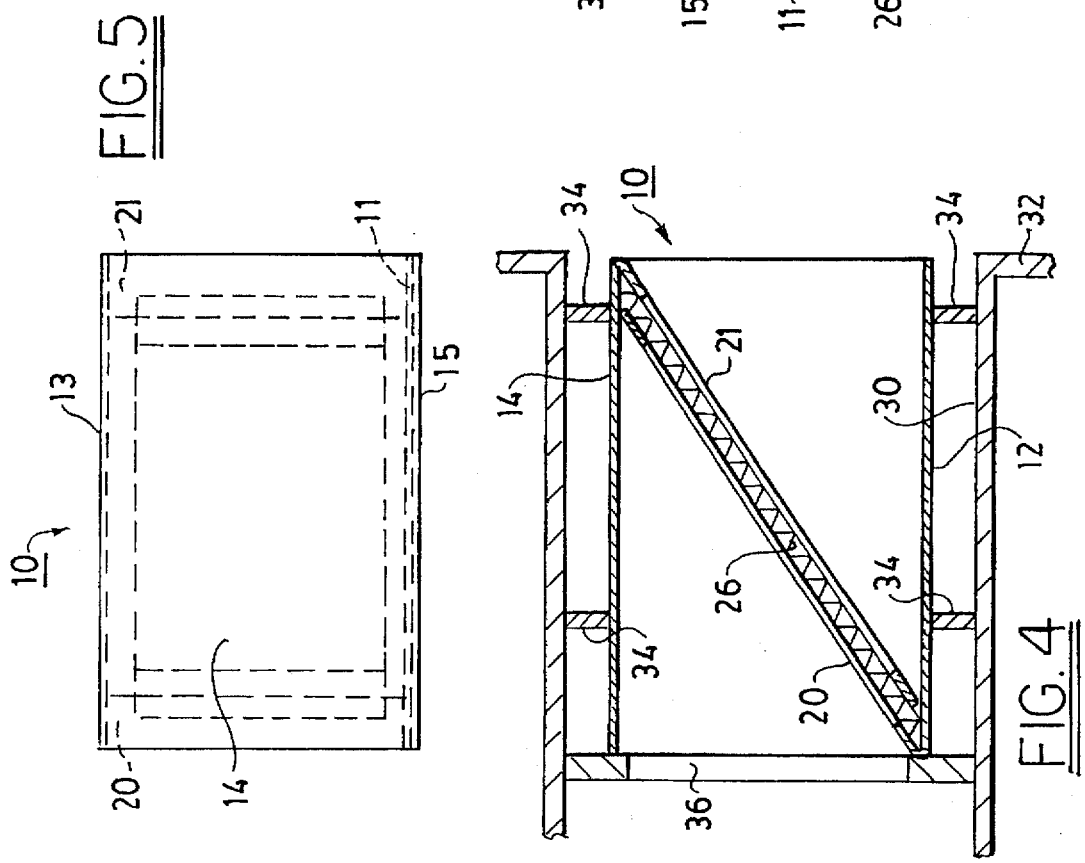

ONE-PIECE FILTER HOUSING

This application claims the benefit of U.S. provisional application Ser. No. 60/003,791, filed on 15 Sep. 1995, which provisional application is incorporated by reference herein.

TECHNICAL FIELD

The invention relates to fluid filters and, more particularly, to housings for supporting air filter media.

BACKGROUND OF INVENTION

Forced air systems are used for heating and/or cooling a wide variety of structures and equipment such as houses, commercial buildings, computers, automobiles, etc. Such systems use filters to remove particulates and vapors from the air being delivered to or from the system. Such filters comprise a filter media, in the form of panels or pads (woven or non-woven, pleated or flat), which are held in suitable frame-like housings that direct the flow of air (or other gases) through the media for removing the particulates and/or vapors.

Such filter media are supported in various forms of housings which, in more recent years, are being manufactured in simpler and more economical fashion. For instance, in U.S. Pat. No. 3,447,691 issued to P. D. Andrews et al., a single sheet of four serially-interconnected panels is folded into a rectangular tunnel-like housing around a rectangular filter block. Other known one-piece housings, made of molded plastic or single sheets of paperboard or other fibrous materials, have been folded to form frame-like members which support the periphery of (a) pleated filter media panels (see U.S. Pat. No. 3,778,985 to Daigle et al. and U.S. Pat. No. 5,273,564 to Hill), or (b) unwoven media pads (see Pat. No. U.S. 3,938,973 to Kershaw and U.S. Pat. No. 4,086,071 to Champlin), or (c) filter bags (see U.S. Pat. No. 5,320,655 to Ernst).

My invention is a further improvement of such prior art filter media housings.

SUMMARY OF THE INVENTION

My invention provides a lightweight, self-supporting media housing that is remarkably inexpensive to manufacture and remarkably simple to assemble. The housing itself forms the exterior dimensions of the operational filter unit; and it requires no other bracing for protecting the media during shipment, operation, insertion, or removal. Further, the housing and its filter media may be simply and safely discarded following use and removal.

My housing is economically and simply manufactured by the die cutting of a single flat sheet of plastic, fiberboard, paperboard, or other similar material. The flat sheet material is die cut on one side only to create (a) a plurality of panels serially interconnected at respective scored fold lines and (b) a pair of holding-frame portions, each of which is interconnected at a scored fold line that is shared with one end of a respective panel. The two respective panels from which the holding-frame portions extend are separated from each other by a third panel; and the holding-frame portions extend, respectively, from oppositely disposed ends of their respective panels.

When the sheet material is placed in folded orientation by being folded along the scored fold lines, it forms a structure with a tunnel-like passageway open at both ends, and the oppositely disposed holding-frame portions are positioned within the passageway. The filter media element is captured between the holding-frame portions, being supported diagonally along the length of the tunnel-like passageway. With this diagonal orientation, it is possible to provide a filtering surface that is greater in area than the cross-sectional area of the duct through which the air or other gas is being delivered, providing longer filter life and a lower pressure drop across the filter.

Two preferred embodiments are disclosed, one of which provides a rectangular, box-like structure. In the second embodiment, the housing is non-rectangular, being tapered from front to back. These embodiments illustrate that the invention can be used to provide filter housings specially designed to mate with the contours of rectangular or non-rectangular ducts.

During assembly, the filter media is merely placed between the holding frames, being held in place and sealed thereafter by being pressed between the holding frames when the two outermost panels are folded into superimposed alignment with each other. Therefore, after insertion of the filter media element, the filter unit is quickly and simply completed by merely fastening (e.g., by pressure-sensitive adhesive) the two outer panels of the housing to maintain them in their superimposed alignment.

DRAWINGS

Figure 1:
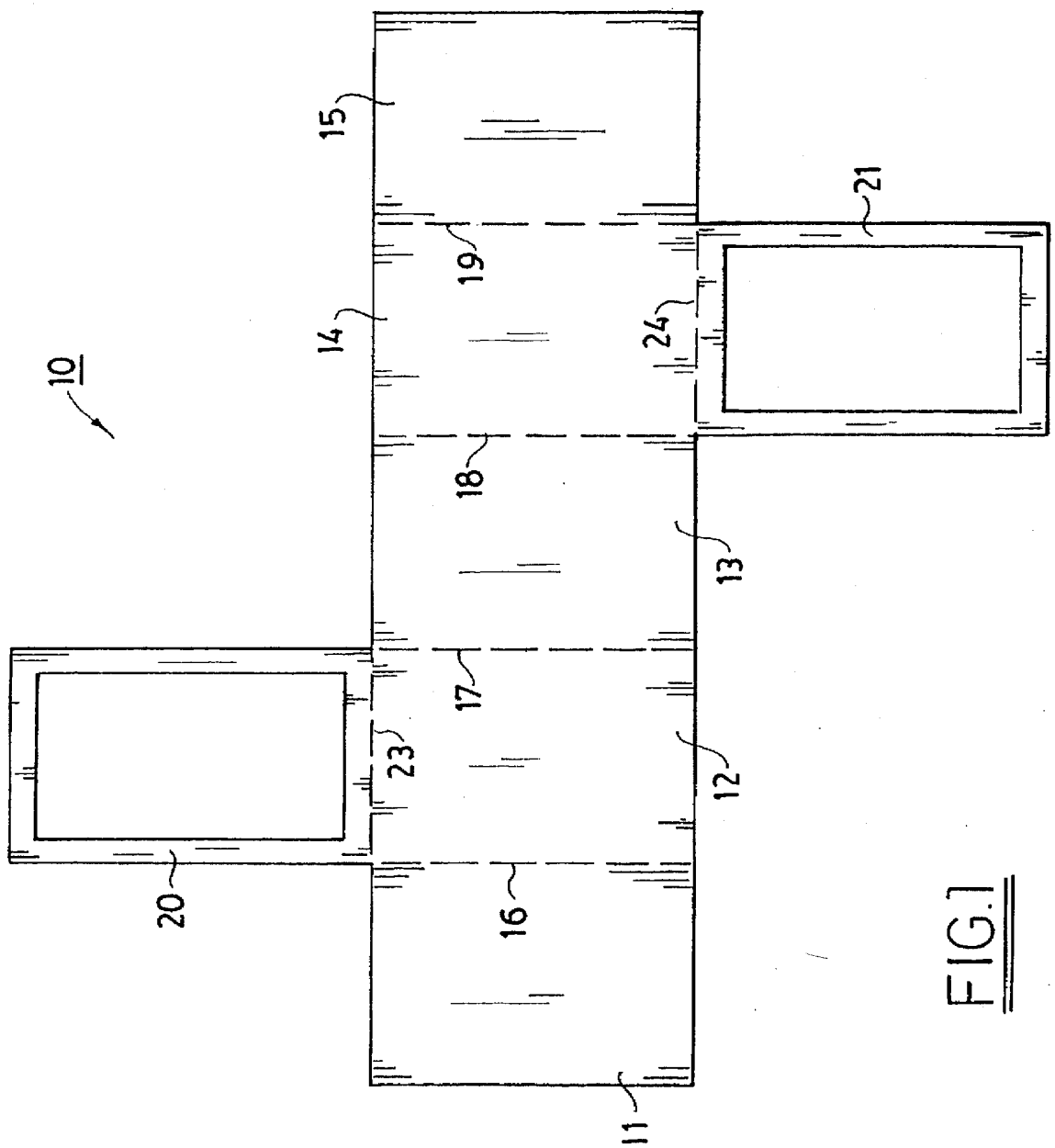
FIG. 1 is a plan view of a first preferred embodiment of my housing when initially formed as a flat sheet of material which has been die cut and scored with fold lines.
Figure 2:
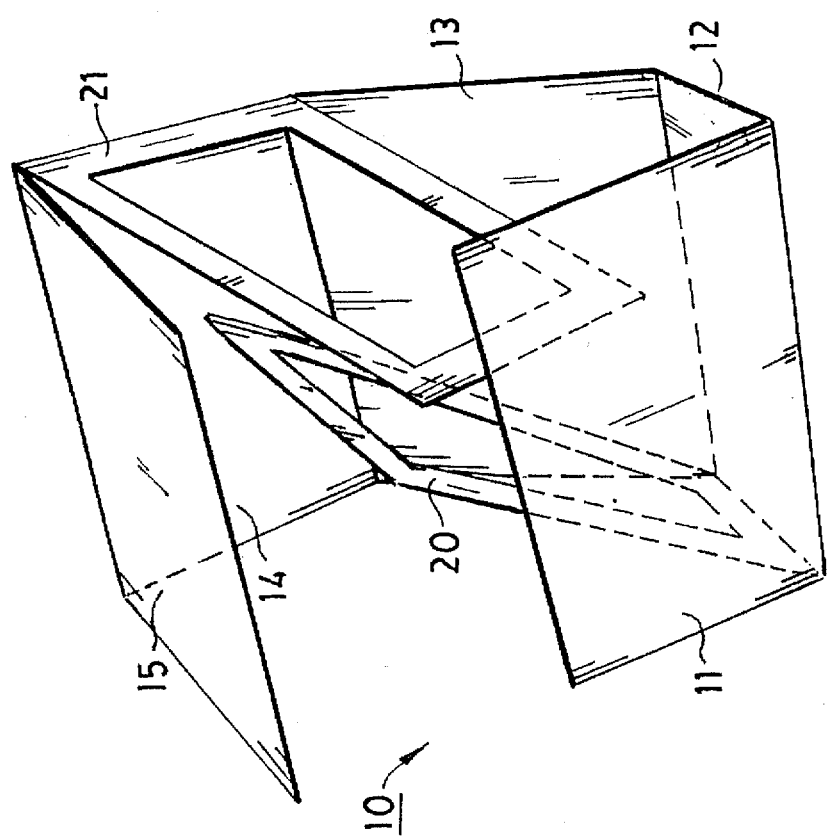
FIG. 2 is a perspective view of the sheet shown in FIG. 1 when partially folded along the scored fold lines.

FIGS. 3, 4, and 5 are (respectively) end, side, and top views of the housing shown in FIGS. 1 and 2, FIG. 4 being a cross-sectional view taken along the line 4—4 of FIG. 3, and FIGS. 3 and 4 illustrating the housing supporting a filter media element and positioned within a duct formed in the body of a piece of equipment for delivering filtered air to the equipment.

Figure 6:
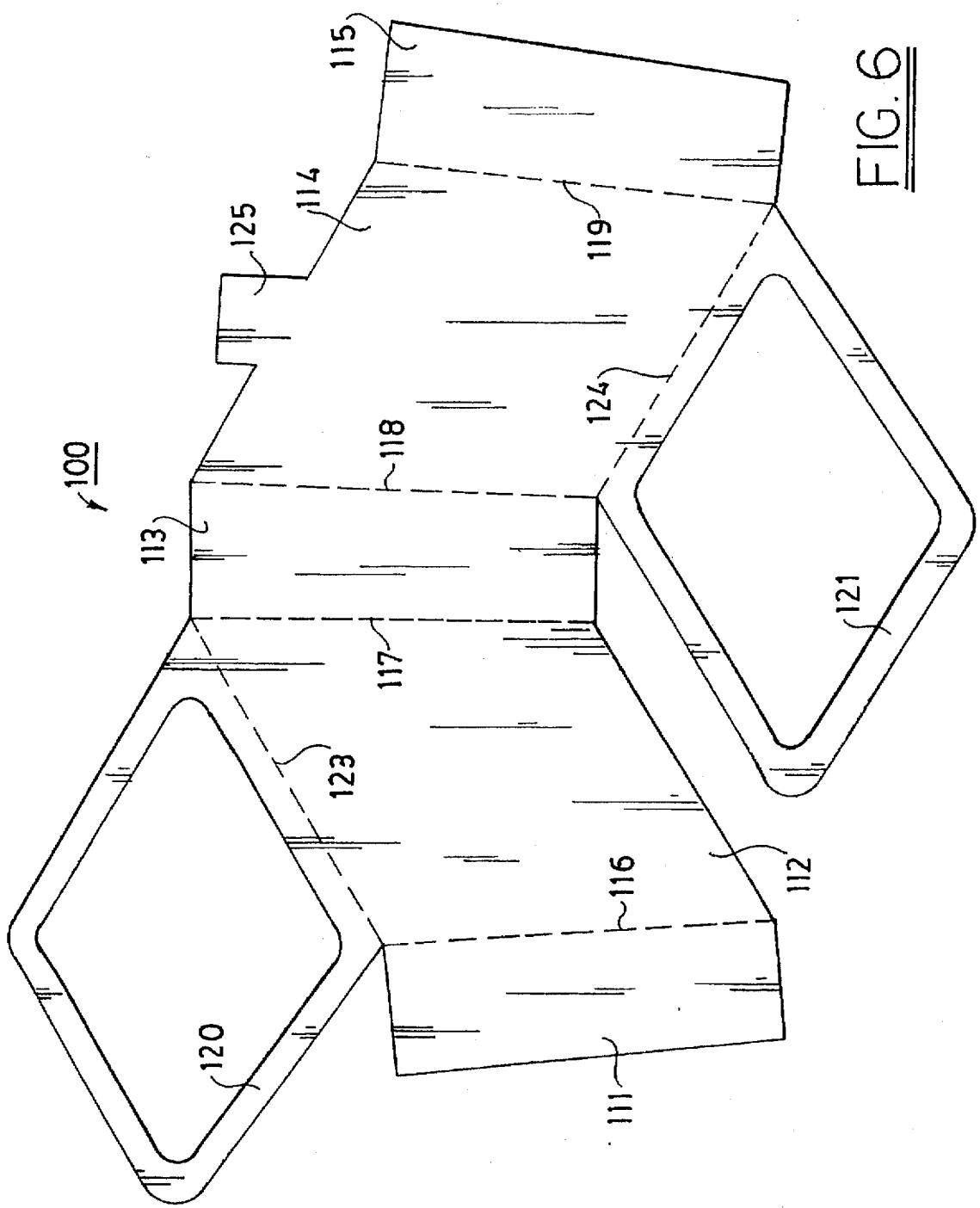

FIG. 6 is a plan view of a second embodiment of my invention, again showing the housing as a flat sheet die cut and scored. [NOTE: This is a view similar to that shown in FIG. 1, namely, this figure is not a perspective drawing, but is a plan view of the flat sheet prior to folding.]

Figure 7:
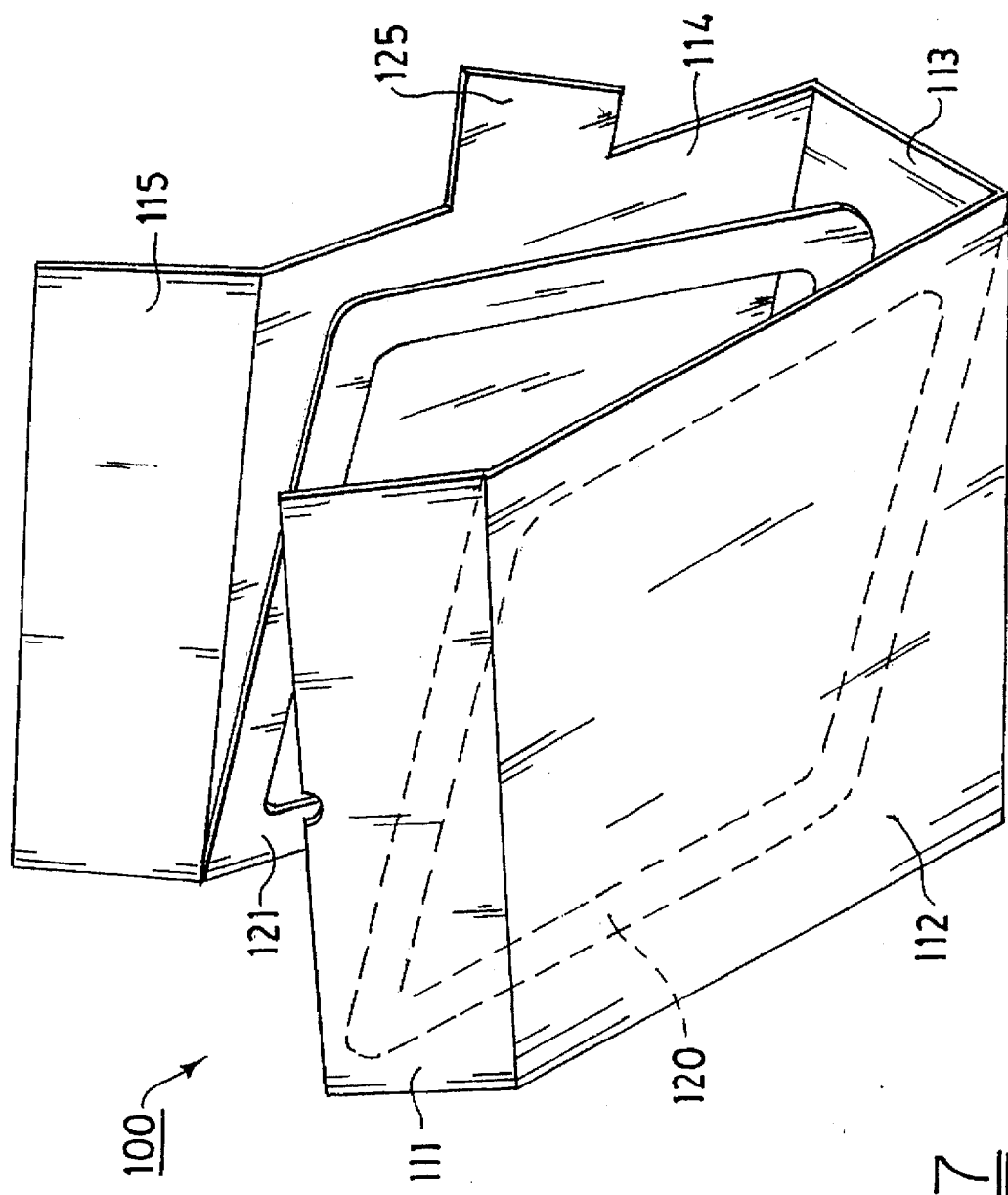

FIG. 7 is a perspective view of the housing shown in FIG. 6 when partially folded along the scored fold lines.

Figure 8:
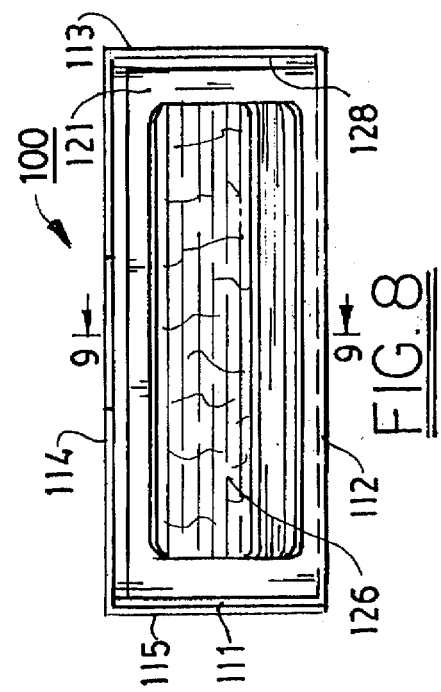
Figure 9:
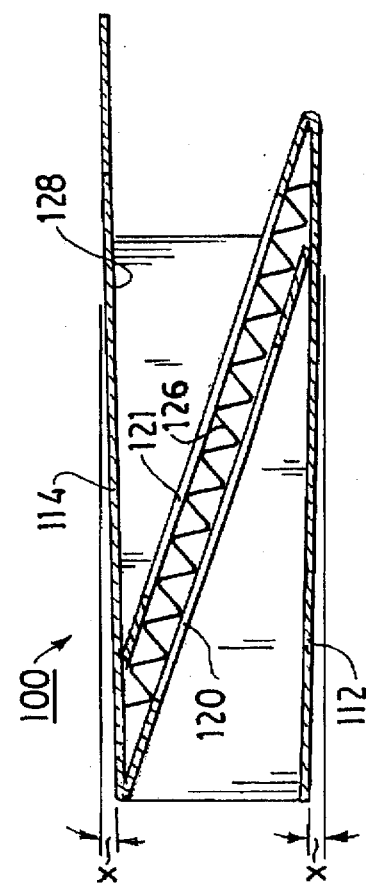
Figure 10:
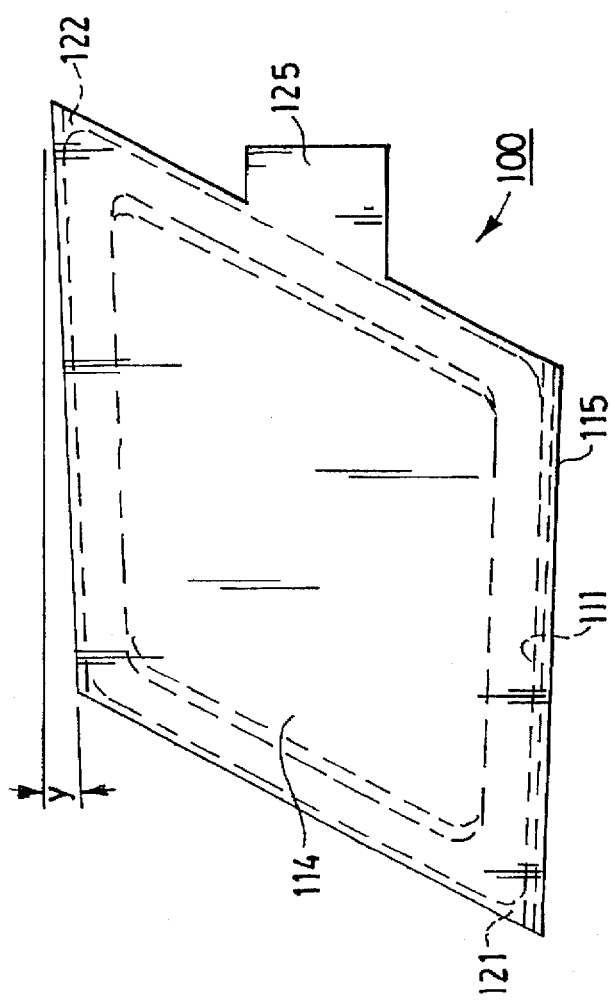

FIGS. 8, 9, and 10 are (respectively) end, side, and top views of the tapered housing shown in FIGS. 6 and 7, FIG. 9 being a cross-sectional view taken along the line 9—9 of FIG. 8, and FIGS. 8 and 9 showing the housing supporting a filter media element.

DETAILED DESCRIPTION

Referring to FIG. 1, a first embodiment of my housing 10 is shown as it is initially formed as a flat sheet of material which has been die cut and scored with fold lines. A plurality of panels 11, 12, 13, 14, and 15 are serially interconnected, being separated at respective scored fold lines 16, 17, 18, and 19 so that each panel has at least one side connected to another panel at one of the scored fold lines.

A pair of holding-frame portions 20, 21 extend, respectively, from panels 12 and 14, the latter being separated by intervening panel 13. Holding-frame portion 20 is delineated from panel 12 by scored fold line 23, while holding-frame portion 21 is delineated from panel 14 by scored fold line 24.

When partially folded along the scored lines, housing 10 appears as shown in perspective in FIG. 2. Namely, holding-frame portions 20 and 21 extend diagonally within a tunnel-like passageway formed within the panels when panel 15 is superimposed over panel 11. However, prior to the final closing of housing 10, an appropriately-sized filter media element 26 is inserted between holding frame portions 20 and 21. Filter media element 26 is shown in FIGS. 3 and 4.

FIGS. 3, 4, and 5 are (respectively) end, side, and top views of housing 10 after it has been fully folded and sealed with panel 15 superimposed over panel 11. FIGS. 3 and 4 show housing 10 in its completed state in which the periphery of filter media element 26 is pressed between holding-frame portions 20 and 21. Preferably, filter media element 26 is held in place and sealed within the housing solely by pressure exerted thereon by holding-frame portions 20 and 21. FIGS. 3 and 4 also show completed housing 10 positioned within an air duct 30 formed in the body 32 of a piece of equipment that includes a forced air system. Duct 30 includes an appropriate receptacle for receiving housing 10, the receptacle being formed by a set of baffles 34 and a stop plate 36. [NOTE: The dimensions of baffles 34 and stop plate 36 have been exaggerated to increase clarity. In actual practice, the cross-sectional area of the receptacle would normally be much closer to the actual cross-sectional area of duct 30.]

The exterior dimensions of housing 10 have been selected to mate appropriately with the predetermined dimensions of the receptacle formed in duct 30 by baffles 34 and stop plate 36. Namely, as can be best seen in FIG. 3, housing 10 mates with baffle 34 to create an appropriate air-tight fit. As can be readily noted from FIG. 4, the resulting filtering surface of filter media element 26 is considerably greater than the cross-sectional area of duct 30. As indicated above, this latter feature provides longer filter life and also reduces the pressure drop across the filter (i.e., compared to the pressure drop across a filter having only the cross-sectional area of the duct itself). In this embodiment, the predetermined length of the tunnel-like passageway 28 formed within the panels is greater than either the cross-sectional width or the cross-sectional height of tunnel-like passageway 28.

FIGS. 6–10 illustrate a second embodiment of my invention in which a housing 100 is used to create a filter unit that is specially tapered to provide exterior dimensions appropriate for mating with a suitable duct receptacle (not shown) to provide a friction fit and seal.

FIG. 6 is a plan view (similar to FIG. 1) showing housing 100 in flat sheet form immediately following a die cut operation. Again, a plurality of panels, 111, 112, 113, 114, and 115, are serially interconnected at respective scored fold lines 116, 117, 118, and 119. A pair of holding-frame portions 120, 121 extend from respective panels 112 and 114, being delineated therefrom by respective scored fold lines 123, 124. Also, extending from panel 114, at the end opposite to that from which holding-frame portion 121 extends, is a tab 125 which is provided to facilitate handling, insertion, and removal of housing 100 after it has been appropriately folded and completed as a filter unit.

FIG. 7 shows housing 100 partially folded with holding frame portions 120, 121 folded to the inside of the housing.

FIGS. 8, 9, and 10 are (respectively) end, side, and top views of housing 100 when it has been folded into its final shape. FIG. 9 is a cross-sectional view taken along the plane 9—9 indicated in FIG. 8, and FIGS. 8 and 9 show a filter media element 126 captured and held between holding-frame portions 120, 121. As can be seen in FIGS. 9 and 10, in its finished orientation, housing 100 is tapered from front to back along its top and bottom portions by the respective angles x, and it is tapered from front to back along its left side by the angle y.

In the manner explained above with regard to the first embodiment, housing 100 is simply assembled by the placement of filter media element 126 between holding-frame portions 120, 121 followed by the superimposition of panel 115 over panel 111 and the appropriate fastening of the latter to panels in their superimposed final orientation.

The exterior dimensions of housing unit 100 are appropriately designed to form an air-tight connection with the air duct of a particular piece of equipment (not shown). In this embodiment, the predetermined length of tunnel-like passageway 128 formed within the panels is greater than the cross-sectional height of tunnel-like passageway 128 so that, once again, the exposed area of filter media 126 is significantly larger than the cross-sectional area of the tunnel-like passageway 128 formed by the folded panels of housing 100. As indicated above, this feature provides the advantages of longer filter life and reduced pressure drop in the filtered air duct.

I claim:

1. A one-piece housing for supporting a filter media element for filtering particulates from gases when said filter media element is inserted within a duct having predetermined dimensions and a predetermined cross-sectional area, said housing comprising:

a single piece of foldable sheet material cut and scored with fold lines to form:

a plurality of panels, serially interconnected from a first panel to a last panel, each panel having respective ends and each having at least one side connected to another panel at one of said scored fold lines; and a pair of holding-frame portions, each interconnected at one of said scored fold lines with and extending from one said end of a respective one of two of said panels which are separated from each other by a third one of said panels, said holding-frame portions extending respectively from oppositely disposed ends of said two respective panels;

said sheet material having a folded orientation when being folded along said scored fold lines so that said first and last panels are superimposed upon each other to form a structure with (a) exterior dimensions compatible for mating with said predetermined dimensions of said duct when inserted therein, and with (b) a tunnel-shaped passageway open at both ends with said oppositely disposed holding-frame portions positioned within said passageway to provide a support for holding said filter media element therebetween, said filter media element being captured between said oppositely disposed holding-frame portions to filter gases passing through a predetermined exposed filtering area formed within said passageway when said structure is inserted within said duct.

2. The housing of claim 1 wherein said tunnel-shaped passageway has a predetermined length and cross-sectional area, and said filter media element is supported within said passageway so that said predetermined exposed filtering area of said housing is greater than said cross-sectional area, of said passageway.

3. The housing of claim 2 wherein said oppositely disposed holding-frame portions support said filter media element diagonally along the length of said passageway.

4. The housing of claim 2 wherein, when in said folded orientation and said first and last panels are superimposed, said exterior dimensions of said housing form a rectangular box-shaped structure.

5. The housing of claim 4 wherein said predetermined length of said tunnel-shaped passageway formed within said rectangular box-shaped structure is greater than one of (a) a cross-sectional width dimension of said passageway and (b) a cross-sectional height dimension of said passageway.

6. The housing of claim 5 wherein said passageway is formed with a square-shaped cross-sectional area.

7. The housing of claim 5 wherein said passageway is formed with a rectangular-shaped cross-sectional area.

8. The housing of claim 1 wherein said exterior dimensions comprise a non-rectangular structure.

9. The housing of claim 1 wherein a peripheral portion of said filter media element is held in place between said holding-frame portions solely by pressure exerted thereon by said holding-frame portions.

10. The housing of claim 1 wherein said housing is maintained in said folded orientation by fastening only said first and last panels to each other.

* * * * *